US012313560B1

(12) United States Patent
Sun et al.

(10) Patent No.: US 12,313,560 B1
(45) Date of Patent: May 27, 2025

(54) VISUAL TURBIDITY DETECTION DEVICE AND DETECTION METHOD THEREOF

(71) Applicant: BEIJING TECHNOLOGY AND BUSINESS UNIVERSITY, Beijing (CN)

(72) Inventors: Xiaotao Sun, Beijing (CN); Wei Dong, Beijing (CN); Siting Ye, Beijing (CN); Mingquan Huang, Beijing (CN); Hehe Li, Beijing (CN); Jinyuan Sun, Beijing (CN); Baoguo Sun, Beijing (CN); Fuping Zheng, Beijing (CN)

(73) Assignee: BEIJING TECHNOLOGY AND BUSINESS UNIVERSITY, Beijing (CN)

( * ) Notice: Subject to any disclaimer, the term of this patent is extended or adjusted under 35 U.S.C. 154(b) by 0 days.

(21) Appl. No.: 18/922,440

(22) Filed: Oct. 22, 2024

(30) Foreign Application Priority Data

Nov. 20, 2023 (CN) .......................... 202311547624.0

(51) Int. Cl.
*G01N 21/88* (2006.01)
*G01N 21/29* (2006.01)

(52) U.S. Cl.
CPC ....... *G01N 21/8803* (2013.01); *G01N 21/293* (2013.01); *G01N 2201/025* (2013.01); *G01N 2201/062* (2013.01)

(58) Field of Classification Search
CPC ............. G01N 21/8803; G01N 21/293; G01N 2201/025; G01N 2201/062
USPC ....................................................... 356/239.6
See application file for complete search history.

(56) References Cited

FOREIGN PATENT DOCUMENTS

| CN | 110455812 A | * | 11/2019 |
|----|-------------|---|---------|
| CN | 217830053 U |   | 11/2022 |
| CN | 218464183 U |   | 2/2023 |
| CN | 219714972 U |   | 9/2023 |
| CN | 219996869 U |   | 11/2023 |
| KR | 20070044349 A | * | 4/2007 |

* cited by examiner

*Primary Examiner* — Tri T Ton

(57) ABSTRACT

A visual turbidity detection device and detection method thereof includes an observing box, an observing assembly, and a light assembly. The observing box includes a box, at least one side of the box defines an observing window, and at least one side of the box is capable of being disassembled to define an opening for taking and placing a sample to be tested. The observing assembly includes a first base and a first rotation shaft. An end of the first rotation shaft is rotatably connected to a bottom wall of the box, a shaft body of the first rotation shaft is fixedly connected to the first base, another end of the first rotation shaft extends out of a top wall of the observing box, and the first base is configured to place the sample to be tested. The light assembly is disposed on an inner wall of the observing box.

7 Claims, 4 Drawing Sheets

I # VISUAL TURBIDITY DETECTION DEVICE AND DETECTION METHOD THEREOF

TECHNICAL FIELD

The present disclosure relates to the field of liquid turbidity detection technologies, in particular to a visual turbidity detection device and a detection method thereof.

BACKGROUND

Turbidity, is a measure of the decrease in liquid transparency caused by the presence of substances that scatter or absorb light in water. The inspection of turbidity or clarity is a method of checking for the presence of turbidity or foreign matters in the detection liquid. The turbidity is mainly measured by turbidity meters and visually inspected by inspectors. Visual turbidimetry refers to the method of observing and comparing the turbidity of a liquid with eyes. In some practical applications, visual detection of turbidity is necessary due to the need to determine the differences in turbidity between solutions, including complex situations such as turbidity differences, impurity particle size, shape, quantity, and surface reflection.

In a visual turbidimetry method of the related art, inspectors usually directly compare the sample with standard solutions of different turbidity gradients prepared in the natural environment, or detect the presence of turbidity or suspended foreign matters in the liquid under incandescent light transmission. However, these two methods are easily influenced by the subjective judgment of the inspectors and environmental changes, resulting in some smaller diameter particles or slight turbidity being easily overlooked. Secondly, traditional lamp inspection devices operate in a single loading and unloading mode when detecting bottled liquids, and their efficiency is low, which can easily cause visual fatigue after prolonged viewing.

To reduce the inspection errors caused by environmental factors and subjective judgments, providing a stable and simple environment for inspectors to observe solutions in which turbidity differences can be easily detected is currently a problem that needs to be solved.

SUMMARY

The present disclosure aims to solve at least one of the technical problems existing in related art. For this purpose, the present disclosure provides a visual turbidity detection device, which has a simple structure, good visual detection effect for liquid turbidity, and high detection efficiency.

The present disclosure also provides a detection method for the visual turbidity detection device.

A visual turbidity detection device provided by an embodiment of the present disclosure includes:
  an observing box, including a box; where the box defines an observing space inside; at least one side of the box defines an observing window and at least one side of the box is capable of being disassembled from the box to define an opening to take and place a sample to be tested;
  an observing assembly, including a first base and a first rotation shaft, where a first end of the first rotation shaft is rotatably connected to a bottom wall of the box, a shaft body of the first rotation shaft is fixedly connected to the first base, a second end of the first rotation shaft extends out of a top wall of the observing box; the first base is configured to place the sample to be tested; the second end of the first rotation shaft is configured to rotate and drive the first base to rotate under drive of external forces, to make the first base rotate the sample to be tested to an observing position; and the observing window is facing towards the observing position; and
  at least one light assembly, configured to irradiate the sample to be tested in the observing position; wherein the at least one light assembly is disposed on an inner wall of the observing box.

In an embodiment of the present disclosure, the at least one light assembly is multiple light assemblies and at least one of the multiple light assemblies is a full spectrum light-emitting diode (LED) spotlight group.

In an embodiment of the present disclosure, the multiple light assemblies are configured to emit light to make light-emitting directions intersect at the observing position; and/or an axis of the observing window, the multiple light assemblies and the observing position have a same height.

In an embodiment of the present disclosure, the observing assembly further includes at least one test unit, and each test unit includes: a second rotation shaft and a second base; in each test unit, the second base is rotatably connected to an upper part of the first base; a third end of the second rotation shaft is fixedly connected to the second base; the second rotation shaft is configured to rotate and drive the second base to rotate relative to the first base under drive of external forces, a fourth end of the second rotation shaft extends out of the observing box, and the second base defines at least one limit groove configured to place the sample to be tested. The at least one limit groove is multiple limit grooves and the multiple limit grooves are annularly arranged with the second rotation shaft as a center line; and/or the at least one test unit is multiple test units, and the second rotation shafts of the multiple test units are annularly arranged with the first rotation shaft as a center line.

In an embodiment of the present disclosure, each test unit further includes at least one background board; in each test unit, the at least one background board is located between the at least one groove and the second rotation shaft; and the at least one background board is fixedly connected to the second base; and/or
  where the at least one background board is multiple background boards; and in each test unit, the multiple background boards are arranged in one-to-one correspondence with the multiple limit grooves, and the multiple background boards enclose an installation space of the second rotation shaft.

In an embodiment of the present disclosure, each background board is a white background board and each background board provides at least one black stripe.

In an embodiment of the present disclosure, the visual turbidity detection device further includes a shading board, and the first rotation shaft and each second rotation shaft are rotatably connected to the shading board; the second end of the first rotation shaft penetrates through a first connecting hole of the box; the fourth end of each second rotation shaft penetrates through a second connecting hole of the box; the shading board covers the first connecting hole and the second connecting holes; and/or the observing box, the shading board and the observing assembly are opaque structures.

A detection method applied to the visual turbidity detection device provided by a second embodiment of the present disclosure, including:
  opening the box to define the opening;
  placing the sample to be tested on the first base through the opening;

closing the opening;
observing whether an interior of the box is in a dark environment through the observing window;
turning on at least one light assembly;
rotating the first rotation shaft to drive the first base to rotate to make the sample to be tested to the observing position; and
observing the sample to be tested through the observing window.

In an embodiment of the present disclosure, the placing the sample to be tested on the first base through the opening includes:
placing the sample to be tested in a limit groove defined on a second base.

In an embodiment of the present disclosure, the rotating the first rotation shaft to drive the one of the sample to be tested to revolve to the observing position includes:
rotating the first rotation shaft to drive the second bases to rotate around the first rotation shaft as a center line through the first base, thereby making the second base be positioned at the observing position; and
rotating the second rotation shaft to drive the second base to rotate to make the sample to be tested be positioned at the observing position.

The above one or more technical solutions in the embodiments of the present disclosure have at least one of the following technical effects:

The embodiment of the present disclosure provides a visual turbidity detection device, where the visual turbidity detection device defines an observing space inside. The sample to be tested can be placed inside the box for observing, and the box can provide a stable observing environment for the sample to be tested, avoiding the influence of external natural light or other light on the observing of liquid turbidity. Specifically, the multiple light assemblies are set on inner walls of the box, which can provide a stable light source for the detection of the sample to be tested, avoiding visual inspection errors caused by visual fatigue of the inspectors. The sample to be tested can be placed on the first base and rotated to the observing position by rotating the first rotation shaft. At the observing position, the sample to be tested can be observed through the observing window. The adjustment method for the position of the sample to be tested is simple. When multiple samples to be tested are placed on the first base, the observing position of different samples to be tested can be switched by rotating the first rotation shaft, thereby the turbidity detection of multiple samples to be tested can be achieved in one detection and the detection efficiency of the samples to be tested is improved.

In addition to the technical problems solved by the present disclosure, the technical features of the constituent technical solutions, and the advantages brought by the technical solutions with these technical features described above, other technical features of the present disclosure and the advantages brought by these technical features will be further explained in conjunction with accompanying drawings.

BRIEF DESCRIPTION OF DRAWINGS

In order to provide a clearer explanation of the technical solutions in the present disclosure or related art, a brief introduction will be given below to the accompanying drawings required in the embodiments or related art description. It is evident that the accompanying drawings in the following description are some embodiments of the present disclosure. For those skilled in the art, other accompanying drawings can be obtained based on these drawings without creative labor.

Figure 1:
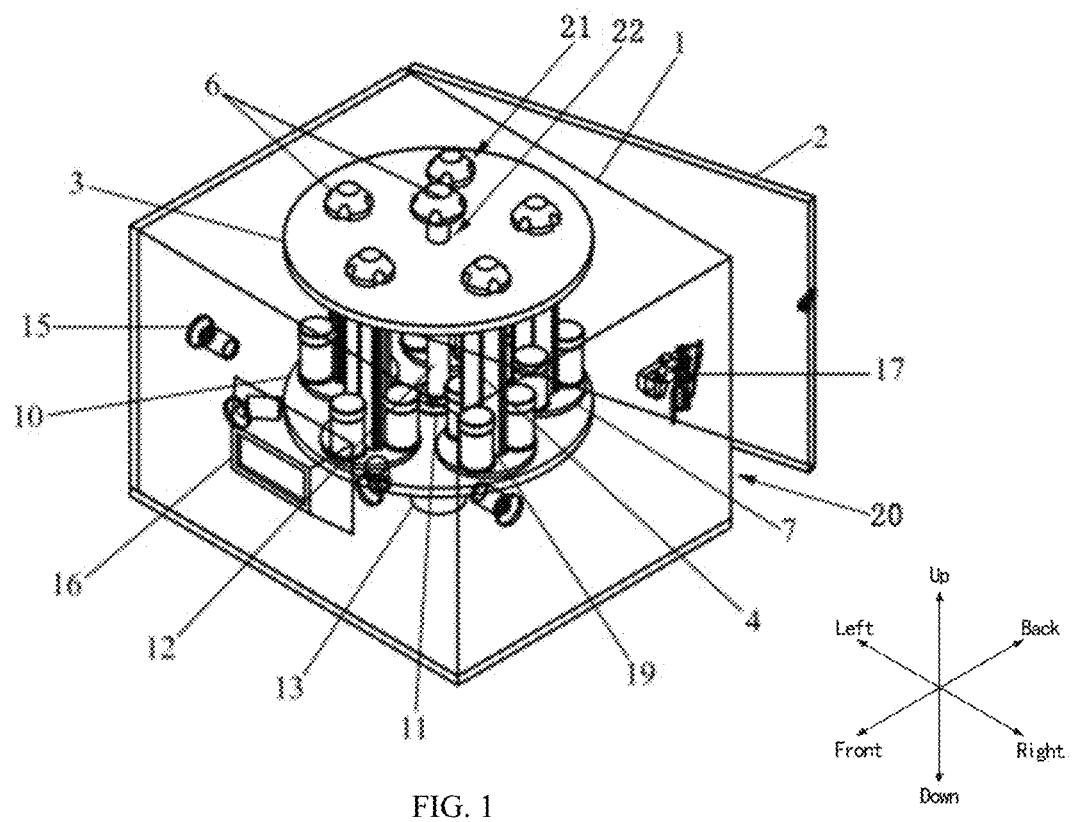
FIG. 1 illustrates a schematic perspective view of a visual turbidity detection device according to an embodiment of the present disclosure.

Description of reference numerals: 1 box; 2 rear board; 3 shading board; 4 background board; 5 second rotation shaft; 6 force application part; 7 second base; 8 limit groove; 9 swivel bearing; 10 first base; 11 elastic nut; 12 first rotation shaft; 13 limit bearing; 14 black stripe; 15 light assembly; 16 observing window; 17 mating part; 18 locking connection part; 19 sample to be tested; 20 opening; 21 second connecting hole; 22 first connecting hole.

DETAILED DESCRIPTION OF EMBODIMENTS

In order to clarify the purpose, technical solution, and advantages of the present disclosure, the following will provide a clear and complete description of the technical solution in conjunction with the accompanying drawings. Apparently, the described embodiments are a part of the embodiments of the present disclosure, not all of them. Based on the embodiments in the present disclosure, all other embodiments obtained by ordinary technicians in the art without creative labor fall within the scope of protection of the present disclosure.

In the description of the embodiments of the present disclosure, it should be noted that the orientation or position relationship indicated by the terms "center", "longitudinal", "transverse", "up", "down", "front", "back", "left", "right", "vertical", "horizontal", "top", "bottom", "inside", "outside", etc. is based on the orientation or position relationship illustrated in the drawings, which is only for the convenience of describing the embodiments of the present disclosure and simplifying the description, and does not indicate or imply that the device or component referred to must have a specific orientation, or be constructed and operated in a specific orientation. Therefore, it cannot be understood as a limitation on the embodiments of the present disclosure. In addition, the terms "first," "second," and "third" are only used to describe the purpose and cannot be understood as indicating or implying relative importance.

In the description of the embodiments of the present disclosure, it should be noted that unless otherwise specified and limited, the term "connected" or "connection" should be broadly understood, for example, it can be a fixed connection, detachable connection, or integrated connection. It can be a mechanical connection or an electrical connection. It can be direct connection or indirect connection through intermediate media. For those skilled in the art, the specific meanings of the above terms in the embodiments of the present disclosure can be understood in specific situations.

In the embodiments of the present disclosure, unless otherwise specified and limited, the first feature is "above" or "below" the second feature may mean direct contact of the first and second features or indirect contact through an intermediate medium of the first and second features. Moreover, the first feature is "above" the second feature, "on" the second feature and "on top of" the second feature may mean the first feature is directly or diagonally above the second feature or only indicates that the first feature is horizontally higher than the second feature. The first feature "below", and "on bottom of" can be the first feature directly or diagonally below the second feature, or simply indicate that the horizontal height of the first feature is lower than that of the second feature.

In the description of this specification, reference to terms such as "one embodiment", "some embodiments", "examples", "specific examples", or "some examples" means that the specific characteristics, structures, materials, or features described in conjunction with the embodiments or examples are included in at least one embodiment or example of the present disclosure. In this specification, the illustrative expressions of the above terms do not necessarily refer to the same embodiments or examples. Moreover, the specific characteristics, structures, materials, or features described can be combined in an appropriate manner in any one or more embodiments or examples. In addition, those skilled in the art may combine the different embodiments or examples described in this specification, as well as the features of different embodiments or examples, without conflicting with each other.

A visual turbidity detection device provided by a first embodiment of the present disclosure is described below in conjunction with FIGS. 1, 2, 3, 4, 5, 6 and 7.

As illustrated in FIG. 1, the first embodiment of the present disclosure provides the visual turbidity detection device, including an observing box, an observing assembly and light assemblies 15.

The observing box includes a box 1, the box 1 defines an observing space inside. At least one side of the box 1 defines an observing window 16 and at least one side of the box 1 is capable of being disassembled from the box 1 to define an opening 20 to take and place a sample to be tested 19. The observing assembly includes: a first base 10 and a first rotation shaft 12. A first end of the first rotation shaft 12 is rotatably connected to a bottom wall of the box 1, a shaft body of the first rotation shaft 12 is fixedly connected to the first base 10, and a second end of the first rotation shaft 12 extends out of a top wall of the observing box. The first base 10 is configured to place the sample to be tested 19. The second end of the first rotation shaft 12 is configured to rotate and drive the first base 10 to rotate under drive of external forces, to make the first base 10 rotate the sample to be tested 19 to an observing position. The observing window 16 is facing towards the observing position. The light assemblies 15 are disposed on the inner wall of the observing box, and configured to irradiate the sample to be tested 19.

The visual turbidity detection device is provided by the embodiment of the present disclosure, in which an observing space is defined inside the box 1 of the observing box. The sample to be tested 19 can be placed inside the box 1 for observing, and the box 1 can provide a stable observing environment for the sample to be tested 19, avoiding the influence of external natural light or other light on the observing of liquid turbidity.

In the visual turbidity detection device, each light assembly 15 is installed on an inner wall of the box 1, which can provide a stable light source for the detection of the sample to be test 19. The light assembly 15 provides uniform irradiation, which helps to observe the turbidity of the sample to be test 19 more clearly, thereby avoiding visual inspection errors caused by visual fatigue by the inspectors. The sample to be test 19 can be placed on the first base 10. By rotating the first rotation shaft 12, the sample to be tested 19 can be rotated to the observing position. At the observing position, the sample to be tested 19 can be observed through the observing window 16. The adjustment method for the position of the sample to be tested 19 is simple.

When multiple samples to be tested 19 are placed on the first base 10, the observing position of different samples to be tested 19 can be switched by rotating the first rotation shaft 12, so that the turbidity detection of the multiple samples to be tested 19 can be achieved in one detection, thereby improving the detection efficiency of the multiple samples to be tested 19. Of course, one sample to be tested 19 can also be placed inside the box 1 to improve the observing effect of the sample to be tested 19.

In this embodiment, at least one side of the box 1 defines an observing window 16. It can be understood that at the observing position, the irradiating direction of each light assembly 15 can irradiate the sample to be tested 19 located at the observing position, and the inspectors can observe the turbidity of the sample to be tested 19 irradiated by the light through the observing window 16. It can also be understood that the observing window 16 is set at a position where the light assemblies 15 can irradiate the sample to be tested 19.

It can be understood that when observing the turbidity of the sample to be tested 19, the box 1 can provide a relatively enclosed observing space for the observing of the sample to be tested 19, thereby avoiding the influence of external light sources or other light sources on the detection of the sample to be tested 19. The term "relatively closed" can be understood as the box 1 separating the observing assembly from the external environment, but it is not completely closed. Inspectors can still observe the sample to be tested 19 through observing window 16.

In conjunction with FIG. 1, taking the observing position located at the front side as an example, correspondingly, the observing window 16 can be defined on at least one side of the box 1, and the at least one side could be any one side of the front side, the left side, the rear side, and the top side of the box 1. The observing windows 16 can be respectively defined on two sides of the box 1, and the two sides could be any two sides of the front side and the left side, the front side and the rear side, the left side and the right side, etc. Of course, the observing windows 16 can also be respectively defined on three sides of the box 1, such as the front, left, and right sides. Defining the observing windows 16 on different sides of the box 1 can observe the sample to be tested 19 from different angles, improving the detection effect and quality of the sample to be tested 19. In this embodiment, the observing window 16 can observe the observing position, and the number and position of the observing window 16 can be chosen according to actual needs without limitation. Of course, the observing position can be set at the front, rear, left, right, etc. Correspondingly, the observing window 16 can be set on the side where the observing position can be observed.

It should be noted that when one observing window 16 is defined, the inspector can achieve a sealing effect with the observing window 16 as the inspector observes through the observing window 16. In other words, the inspector can cover the area of the observing window 16, thereby avoiding external light sources from entering the observing space from the observing window 16 and improving the detection effect of liquid turbidity. When multiple observing windows 16 are defined, the multiple observing windows 16 are respectively equipped with window covers, which can be reassembly connected to the multiple observing windows 16 to achieve switching between open and closed states. In the open state, the inspector can observe the turbidity of the sample to be tested 19 through the observing window 16. In the closed state, the area of the window cover covers the area of the observing window 16, avoiding external light sources from entering the observing space and affecting the observing.

At least one side of the box 1 is capable of being disassembled to define an opening 20 for taking and placing the sample to be tested 19. For example, one side of the box 1 is capable of being disassembled, combined with FIG. 1, the rear side of the box 1 is capable of being disassembled to define the opening 20 for placing and taking the sample 19 to be tested. In an alternative embodiment, the front side, the left side, or the right side of the box 1 can be disassembled to define the opening 20. In another alternative embodiment, two sides of the box 1 are capable of being disassembled to define the opening 20, and the two sides of the box 1 are capable of being disassembled with a larger opening area, thereby improving an operating space for taking and placing the sample to be tested 19, thereby improving the efficiency of loading and unloading the sample to be tested 19, that is, the efficiency of taking and placing the sample to be tested 19. Of course, three sides of the box 1 can also be capable of being disassembled to define an opening 20, and the defining of the opening 20 can be adjusted according to actual needs, without limitation here.

What needs to be explained about the side where the observing window 16 is defined and the side capable of being disassembled of box 1 is: In an embodiment, the side where the observing window 16 is defined can be opposite to the side capable of being disassembled of the box 1. Referring to FIG. 1, when the observing window 16 is defined on the front side, the rear side of the box 1 can be capable of being disassembled to define the opening 20. Of course, the side where the observing window 16 and the side capable of being disassembled can be a same side, which facilitates the taking, placing, and observing of the sample to be tested 19 in one same direction. Of course, the side where the observing window 16 and the side capable of being disassembled can be adjacent. The side where the observing window 16 is defined and side capable of being disassembled of the box 1 can be chosen according to needs, without any restrictions here.

In an embodiment, along the direction close to the observing space, a cross-sectional area of the observing window 16 gradually increases, which can improve a transmittance of light and help increase an amount of light entering the observing window 16, thereby improving a clarity of observing and improving a quality and effectiveness of observing.

Figure 2:
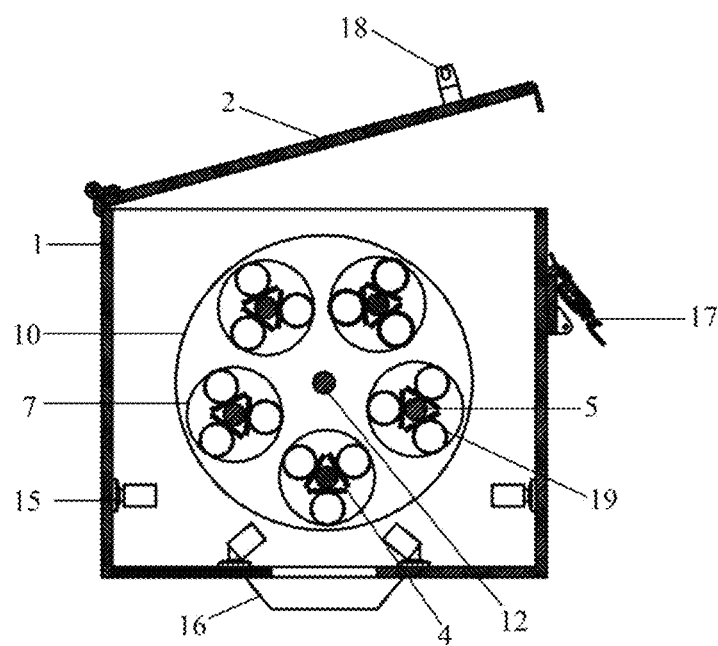
FIG. 2 illustrates a schematic top view of the visual turbidity detection device according to the embodiment of the present disclosure.

As illustrated in FIGS. 1 and 2, the rear board 2 of the box 1 can be detachably connected to the right board of the box 1. A mating part 17 is located on a right board of the box 1, and correspondingly, a locking connection part 18 is located on the rear board 2. At the position where the opening of the rear board 2 is closed, the locking connection part 18 can be snapped to the mating part 17 to achieve connection between the rear board 2 and the right board. Of course, the rear board 2 and the right board are not limited to being snapped, that is, the at least one side of the box 1 is capable of being disassembled can be connected by means in any one of being snapped, being inserted, being threaded or being spring clamped.

About the light assemblies 15, the light assemblies 15 are configured to irradiate the sample to be tested 19 located at the observing position.

The light assembly 15 can be placed on a same side with the observing window 16. According to FIG. 1, the light assembly 15 and the observing window 16 are located and defined on the front side of the box 1, and the light assembly 15 is located on an inner wall of the box 1. Placing the light assembly 15 and the observing window 16 on the same side can ensure that a direction of light irradiation is the same as that of the inspector's line of sight (the same can be understood as both are from the front side of the box 1 to the observing position), which helps to reduce the generation of shadows and ensure that the surface of the sample to be tested 19 is uniformly irradiated, improving the accuracy of observing.

Figure 3:
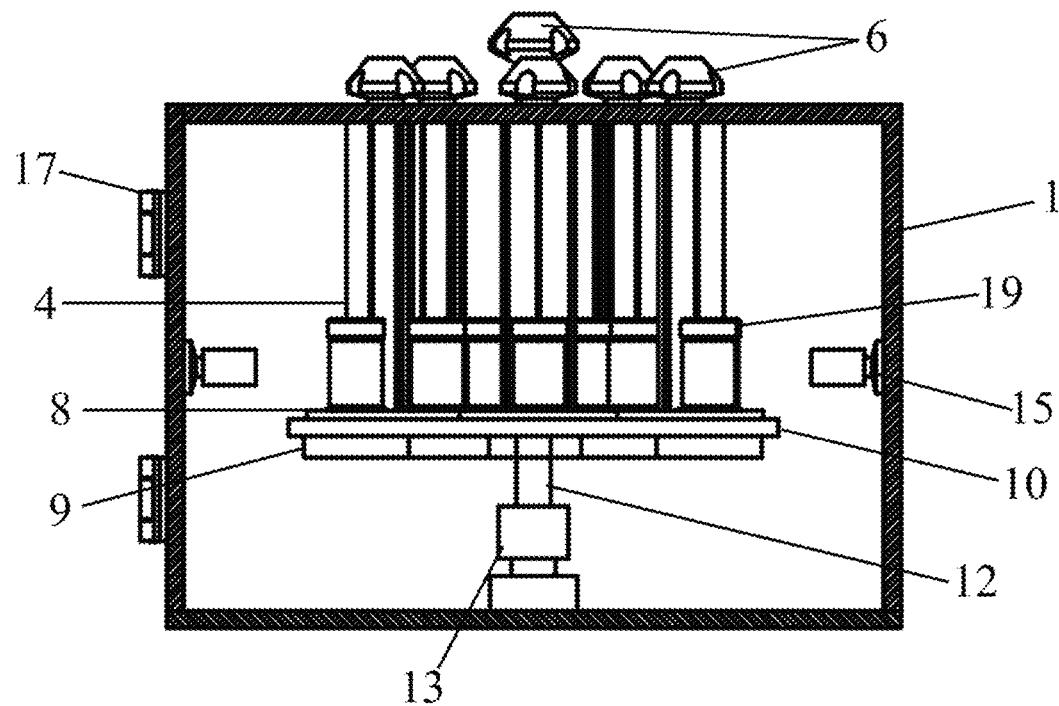
FIG. 3 illustrates a schematic side view of the visual turbidity detection device according to the embodiment of the present disclosure.

The light assembly 15 can also be placed on a side adjacent to the observing window 16. As illustrated in FIG. 3, the light assemblies 15 are arranged on the left and right sides of the box 1. Of course, the light assembly 15 can also be placed on the top side of the box 1 to achieve irradiation of the sample to be tested 19 at different angles. Irradiating the sample to be tested 19 from different angles helps to reduce or avoid possible shadows on the sample to be tested 19, further improving the reliability of the observing and making it easier for inspectors to observe changes in the turbidity of the sample to be tested 19.

The light assemblies 15 can be located on the same side and adjacent sides to the observing window 16. Combined with FIG. 1, the observing window 16 is defined on the front side, and the light assemblies 15 are located on the front, left, and right sides, which can effectively improve the observing of the turbidity difference of the sample to be tested 19.

It should be noted that the number of the light assembly 15 can be one to irradiate the sample to be tested 19 at the observing position. The number of the light assembly 15 can be multiple, and the multiple lighting assemblies 15 can also be provided to irradiate the sample to be tested 19 at different angles, in order to improve the observing effect.

In an embodiment, the multiple light assemblies 15 are provided, and at least one light assembly 15 of the multiple light assemblies 15 is a full spectrum LED spotlight group. The full spectrum LED spotlight group can achieve full spectrum coverage and provide different colors of light (such as red and blue light) to meet different observation needs, which helps to observe and analyze the changes in turbidity of the sample to be tested 19 more comprehensively and accurately. Compared to using incandescent lamps for projection, the full spectrum LED spotlight group serves as a scattering detection light source, providing a stable light source close to natural light in the observing box, solving the problems of large changes in natural light sources and insufficient wavelength range of incandescent lamp light sources. Meanwhile, compared to incandescent lamps that consume more energy and generate more heat, the full spectrum LED spotlight group in this embodiment not only has lower energy consumption, which helps to reduce energy consumption and improve energy efficiency, but also generates lower heat, which helps to avoid the influence of heat on the sample to be tested 19 and thus affect the change in turbidity.

The scattered light of the full spectrum LED spotlight group has multi-angle penetration, which means that the scattered light can penetrate the sample to be tested 19 in different paths. This not only increases the irradiation angle for smaller diameter particles or slight turbidity when passing through the solution of the sample to be tested 19, but also improves the detection sensitivity of turbid substances in the solution, making it easier for inspectors to detect small differences caused by turbid substances. Moreover, it can effectively reduce the burden on inspectors when looking directly at the light source during visual observation, avoid visual fatigue of inspectors, and reduce work intensity.

It should be noted that the multiple lighting assemblies 15 are provided, and at least one light assembly 15 is a full spectrum LED spotlight group, it can be that all light assemblies 15 are full spectrum LED spotlights, or some of them are full spectrum LED spotlights, and the other part is other light source irradiation structures (such as incandescent lamps, laser lamps, fluorescent lamps, etc.).

In some embodiments, the intersection of the irradiation directions of the multiple light assemblies 15 at the intersection position not only helps to reduce an interference of a light source on the inspectors and improve the comfort of observation, but also ensures that the multiple light assemblies 15 can irradiate on the sample to be tested 19, improving the stability of observation.

In an embodiment, the multiple lighting assemblies 15 have a same height, which helps to reduce observation errors caused by height differences and improve observation consistency and reliability. Of course, the multiple light assemblies 15 can also be located with different heights, and the irradiation directions of the multiple light assemblies 15 at different heights are different from the observing position to provide irradiation at different heights.

As illustrated in FIG. 1, an axis of the observing window 16, the multiple lighting assemblies 15, and the observing position have a same height, which helps to reduce observation errors caused by height differences, ensure consistent observation conditions are provided in different detection processes, improve detection repeatability and comparability of results, and thus improve detection reliability.

The observing assemblies will be explained below.

Figure 4:
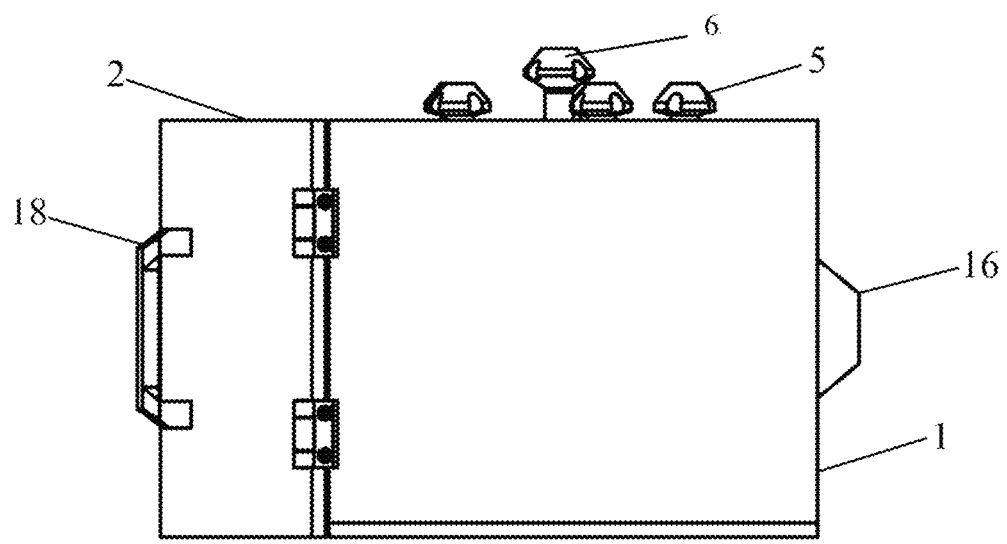
FIG. 4 illustrates a schematic rear view of the visual turbidity detection device according to the embodiment of the present disclosure.
Figure 5:
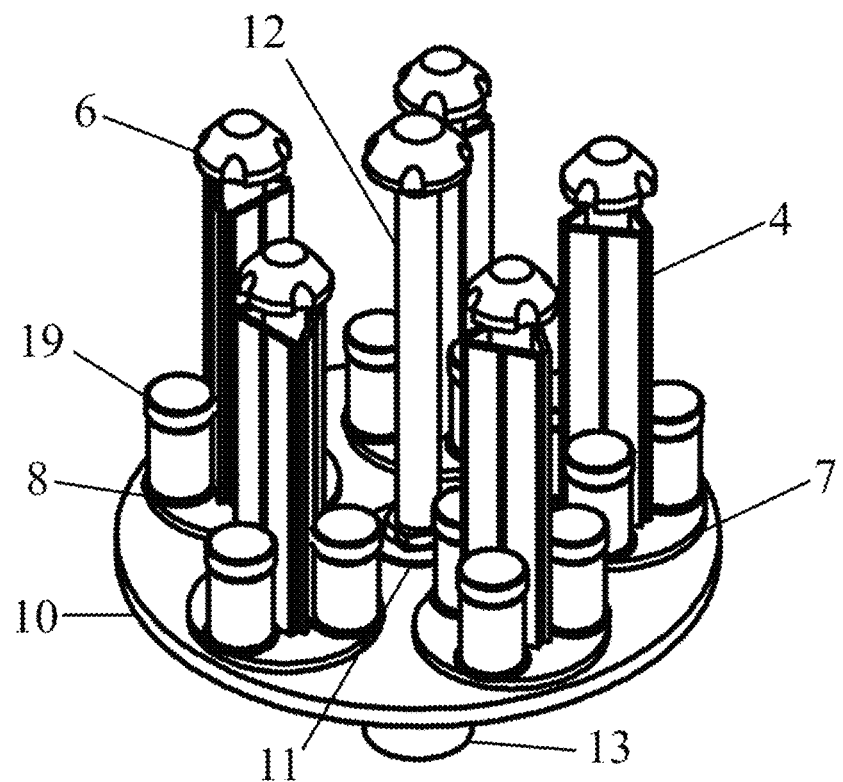
FIG. 5 illustrates a schematic structural diagram of an observing assembly according to the embodiment of the present disclosure.

As illustrated in FIGS. 4 and 5, the observing assembly also includes at least one test unit, and each test unit includes: a second rotation shaft 5 and a second base 7. In each test unit, the second base 7 is rotatably connected to an upper part of the first base 10, the second rotation shaft 5 is configured to rotate and drive the second base 7 to rotate. A third end of the second rotation shaft 5 is fixedly connected to the second base 7, and the fourth end of the second rotation shaft 5 extends out of the observing box. The second base 7 defines a limit groove 8 configured to place the sample to be tested 19.

Figure 7:
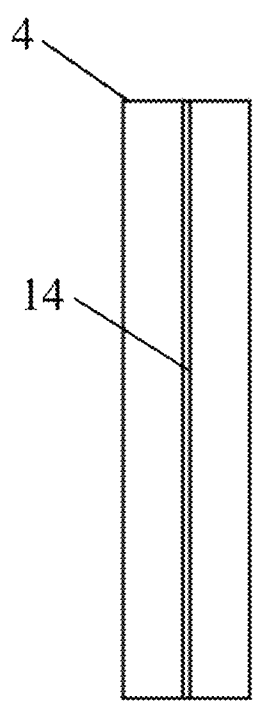
FIG. 7 illustrates a schematic structural diagram of a second rotation shaft, a second base and a sample to be tested according to the embodiment of the present disclosure.

In this embodiment, combined with FIG. 7, the second base 7 defines the limit groove 8 configured to place the sample to be tested 19. The sample to be tested 19 can be limited in the limit groove 8, and the fixation stability of the sample to be tested 19 helps to improve the stability of the sample to be tested 19 during rotation and observation. In the embodiment, the second base 7 is located above the first base 10, and the second base 7 is fixedly connected to the second rotation shaft 5. The rotation of the second rotation shaft 5 can drive the second base 7 to rotate on the first base 10.

In the embodiment, the number of the sample to be tested 19 can be one, and correspondingly, the number of the limit groove 8 can also be one. The combination of the second rotation shaft 5 and the second base 7 can achieve fine adjustment of the sample to be tested 19, thereby the sample to be tested 19 is aligned with the observing window 16.

In some embodiments, in conjunction with FIG. 5, the number of the limit groove 8 can be multiple, and the multiple limit grooves 8 may be annularly arranged with the second rotation shaft 5 as a second center line. In this embodiment, the multiple limit grooves 8 are defined, and multiple samples to be tested 19 are disposed on the second base 7. By rotating the second base 7 through the second shaft 5, different samples to be tested 19 can be switched in the observing position, thereby achieving turbidity detection of the multiple samples to be tested 19 in one detection. Inspectors can continuously observe the multiple samples to be tested 19 in a single test without a need for multiple replacements. This not only effectively improves the efficiency of the test, but also solves the problem of low efficiency caused by the traditional device still needing to take and place the multiple samples to be tested 19 individually. At the same time, it also helps to reduce the frequency of manual loading and unloading, thereby saving testing time and reducing errors caused by replacements.

In this embodiment, the second base 7 defines the multiple limit grooves 8, which can be used to install the samples to be tested 19 and also can be used to install control samples. That is to say, the sample to be tested 19 and the control sample can be placed on the second base 7, which helps to conduct comparative measurements under the same observation conditions, improving the perception of differences in turbidity of the sample to be tested 19.

In an embodiment, the at least one test unit is multiple test units, and multiple second rotation shafts 5 are annularly arranged with the first rotation shafts 12 as a first center line. In this embodiment, the multiple test units are provided, and multiple second rotation shafts 5 are annularly arranged with the first rotation shaft 12 as the first center line, that is, the multiple test units are annularly arranged with the first rotation shaft 12 as the first center line. The first rotation shaft 12 is configured to rotate by rotating the second end of the first rotation shaft 12 to drive the first base 10 fixedly connected to the first shaft 12 to rotate. The first base 10 drives the multiple test units to rotate around the first rotation shaft 12 as the first center line, thereby when one of the multiple test units rotates to the observing position, the first rotation shaft 12 stops rotating to stop the one of the multiple test units at the observing position. The second rotation shaft 5 is configured to rotate by rotating of the fourth end of the second rotation shaft 5 to drive the second base 7 fixedly connected to the second rotation shaft 5 to make the multiple samples to be tested 19 rotate with the second rotation shaft 5 as the second center line, thereby achieving the rotation of the multiple samples to be tested 19 to the observing position for observation.

In this embodiment, the multiple test units enable convenient switching and observation of multiple samples to be tested 19 in a same experiment, resulting in higher detection efficiency. The consistency of the detection environment for multiple samples to be tested 19 is good, thereby improving the detection effect.

Figure 6:
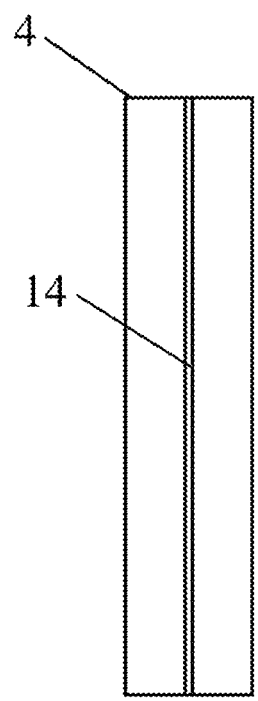
FIG. 6 illustrates a schematic structural diagram of a background board according to the embodiment of the present disclosure.

As illustrated in FIGS. 5 and 6, each test unit further includes a background board 4, which is located between the limit groove 8 and the second rotation shaft 5. In each test unit, the background board 4 is fixedly connected to the second base 7. In this embodiment, the background board 4 can provide a unified background for the sample to be tested 19, thereby solving the problem of background clutter affecting the judgment of solution turbidity in traditional visual turbidity methods. Meanwhile, the background board 4 is for background correction, which corrects measurement errors caused by background light and improves measurement accuracy. The background board 4 is fixedly connected the second base 7 and located between the limit groove 8 and the second rotation shaft 5, which helps to ensure that when the sample to be tested 19 is placed in the limit groove 8, the background board 4 can stably provide a background for the sample to be tested 19, thereby reducing measurement instability caused by changes in the position of the background board 4.

In conjunction with FIG. 5, in an embodiment, the number of the background board 4 is multiple, the multiple background boards 4 correspond one-to-one with the limit grooves 8. The multiple background boards 4 enclose an installation space of the second rotation shaft 5. In this embodiment, each limit groove 8 has a corresponding background board 4, which means that the multiple samples to be tested 19 have their own corresponding background boards 4. This helps to prevent light from passing through or reflecting from a position of one sample to be tested 19 to a position of another sample to be tested 19, effectively reducing cross interference between different samples to be tested 19, and ensuring that each sample to be tested 19 is tested under relatively independent background conditions, thereby improving measurement reliability.

In an embodiment, each background board 4 is a white background board 4, which has strong reflectivity and reflects more light, making it easier to observe the turbidity of the sample to be tested 19. Meanwhile, the white background can evenly distribute light when reflecting light, avoiding the appearance of different colors or brightness areas. This helps to provide more uniform and consistent background conditions, reducing interference during observation.

Furthermore, each background board 4 includes black stripes 14. In this embodiment, in each background board 4, the white background can form a contrast with the black stripes 14, which helps to improve the observer's ability to distinguish stripes. The inspectors can judge the turbidity of the sample to be tested 19 by observing the blurriness of the black stripes 14 obscured by the sample to be tested 19, thereby improving the accuracy of turbidity detection. At the same time, when some of the suspensions in the sample to be tested 19 are similar to a color of the background board 4, it is difficult for the human eye to observe the suspensions that are similar to the color of the background board 4. At this time, the black stripes 14 can reflect the suspensions that are compatible with the white background board 4. By observing the black stripes 14, the suspensions affected by the color of the background board 4 can be further observed, thereby improving observation accuracy and detection effectiveness.

In an embodiment, the number of the black stripe 14 can be one or multiple. Each black stripe 14 can be a straight line, which can extend along the length or width direction of the background board 4. Of course, it can also be straight set at an angle. Each black stripe 14 can also have a shape such as arc, or polyline, etc. Each black stripe 14 can also an enclose shape such as circle, rectangle, triangle, or polygon.

It should be noted that the color of the background board 4 and the black stripe can be set according to actual needs, which can be white or black, or other contrasting colors.

As illustrated in FIG. 1, the visual turbidity detection device includes a shading board 3, a first rotation shaft 12, and a second rotation shaft 5, which are rotatably connected to the shading board 3. The second end of the first rotation shaft 12 penetrates through the first connecting hole 22 of the box 1, and the fourth end of each second rotation shaft 5 penetrates through each second connecting hole 21 of the box 1. The shading board 3 covers the first connecting hole 22 and the second connecting holes 21. In this embodiment, the shading board 3 covers the first and second connecting holes 21, which can reduce an entry of external environmental light, prevent the influence of external light sources on observation, reduce the influence of environmental factors on observation results, thereby improving sensitivity to subtle differences in turbidity, and improving detection accuracy and stability.

It should be noted that the first rotation shaft 12 and at least one of the second shafts 5 is equipped with a force application part 6. Referring to FIG. 1, the force application parts 6 are located at the second end of the first rotation shaft 12 and the fourth ends of the second rotation shafts 5, which is configured to rotate the first rotation shaft 12 or the second rotation shafts 5 by applying force. The rotation operation of the first rotation shaft 12 and the second rotation shaft 5 is convenient, and the rotation operation through the force application parts 6 can also achieve labor-saving operation. By applying control force, uncontrolled vibration or oscillation can be reduced, and the stability of the operation can be improved.

As illustrated in FIG. 1, when the number of the test unit is multiple, the second rotation shaft 5 is also multiple, and the multiple second rotation shafts 5 are arranged with the first rotation shaft 12 as the first center line. Specially, the first rotation shaft 12 penetrates through the first connecting hole 22, and the multiple second rotation shafts 5 penetrate through the second connecting holes 21. The first connecting hole 22 can be a circular hole to allow the first rotation shaft 12 to penetrate through. The second connecting holes 21 can be annular holes, with the multiple second rotation shafts 5 penetrate through the annular holes. The multiple second rotation shafts 5 can rotate in the annular holes and are suitable for rotating around the first rotation shaft 12. The shading board 3 covers the first and second connecting holes 21 to prevent external light sources from entering the observing space from the first connecting hole 22 and the second connecting holes 21.

In some embodiments, the first rotation shaft 12 and the second rotation shafts 5 may penetrate through a same hole. For example, there is a connecting hole defined at the top of the box 1, which is large enough to allow both the first rotation shaft 12 and the second rotation shaft 5 to pass through the connecting hole. At this point, the shading board 3 covers the connecting hole to achieve the shading function.

As illustrated in FIG. 1, the shading board 3 can be set at the top of the box 1, that is, the box 1 is set at the bottom of the shading board 3. The box 1 can provide support for the shading board 3, eliminating the need to set additional components for the fixed support of the shading board 3. The structure of the visual turbidity detection device is simple and the cost is low. At the same time, the shading board 3 is located at the top. When the shading board 3 offsets, it is also convenient for the inspectors to adjust the shading board 3 to fully cover the first and second connecting holes 21. Of course, the shading board 3 can also be rotatably connected to the top wall of the box 1, that is, the shading board 3 is located in the box 1. The shading board 3 can be located according to actual needs, and there are no restrictions here.

In an embodiment, the observing box, the shading board 3, and the observing assembly are all opaque structures. In this embodiment, both the observing box and the shading board 3 are opaque structures, effectively blocking the light from the external environment, preventing interference from ambient light, and ensuring precise control of the light in the observing space. The observing assembly is opaque structure, which can reduce the influence of background light. When the at least one test unit is multiple test units, the possible impact of light refraction or scattering from adjacent test units can be reduced, ensuring that the attention of the inspectors is focused on the current sample to be tested, which helps to improve detection contrast and accuracy.

The present disclosure provides a second embodiment, including a detection method applied to the visual turbidity detection device as described in any one of the embodiments, including the following steps S1 to S7.

In S1, the box 1 is opened to define an opening 20. At least one side of the box 1 is capable of being disassembled to define the opening 20 for taking and placing the sample to be tested 19, through which the sample to be tested 19 can be placed in the observing space.

In S2, the sample to be tested 19 is placed on the first base 10 through the opening 20. In an embodiment, the sample to be tested can be one sample to be tested or multiple samples to be tested 19 to achieve observation of multiple samples to be tested 19 in a single test.

In S3, the opening 20 is closed. After placing the sample to be tested 19, the side capable of being disassembled of the box 1 can be closed to achieve the closure of the box 1 and prevent external light sources from entering the observing space from the opening 20.

In S4, whether the interior of box 1 is in a dark environment is observed through observing window 16. In an embodiment, the sealing condition at the opening 20 can be determined by observing whether the box 1 is in a dark environment, that is, whether the opening 20 is completely covered by the side capable of being disassembled of the box 1. When the visual turbidity detection device also includes a shading board 3, the shading effect at the first connecting hole 22 can be adjusted by adjusting the shading board 3.

In S5, the light assembly 15 is turned on. In an embodiment, a full spectrum LED spotlight group is utilized.

In S6, the first rotation shaft 12 is rotated to drive the sample to be tested 19 to rotate through the first base 10, thereby the sample to be tested 19 is moved to the observing position. In an embodiment, when the sample to be tested 19 is multiple samples to be tested 19, the first rotation shaft 12 can be rotated to sequentially rotate the multiple samples to be tested 19 to the observing position for observation.

In S7, the sample to be tested 19 is observed through the observing window 16.

The detection method applied to the visual turbidity detection device provided by the second embodiment of the present disclosure has simple operation and convenient detection. In the embodiment, the box 1 of the observing box can provide a stable observation environment for the sample to be tested 19, avoiding the influence of external natural light or other light on the observation of liquid turbidity. When multiple samples to be tested 19 are placed on the first base 10, the different samples to be tested 19 can be rotated to the observing position by rotating the first rotation shaft 12, so that the turbidity detection of multiple samples to be tested 19 can be achieved in one detection, thereby improving the detection efficiency of samples to be tested 19.

The sample to be tested 19 is placed on the first base 10 through the opening 20, including the following steps S2'.

In S2', the sample to be tested 19 is placed in the limit groove 8 of the second base 7.

In this embodiment, the observing assembly further includes test units, and each test unit includes a second rotation shaft 5 and a second base 7. The second base 7 is rotatably connected to an upper part of the first base 10, and the second rotation shaft 5 is configured to drive the second base 7 to rotate by external forces. The third end of the second rotation shaft 5 is fixedly connected to the second base 7, and the fourth end of the second rotation shaft 5 extends out of the observing box. The second base 7 defines the limit groove 8 for placing and taking the sample to be tested 19. The sample to be tested 19 can be limited to the limit groove 8, and the fixation stability of the sample to be tested 19 helps to improve the stability of the sample to be tested 19 during rotation and observation. In the embodiment, the second base 7 is located on the first base 10, and the second base 7 is fixedly connected to the second rotation shaft 5. The rotation of the second rotation shaft 5 can drive the second base 7 to rotate on the first base 10.

The first rotation shaft 12 is rotated to drive the sample to be tested 19 to rotate through the first base 10, thereby the sample to be tested 19 is moved to the observing position including the following steps S61 and S62.

In S61, the first rotation shaft 12 is rotated to drive the second base 7 through the first base 10 to rotate with the first shaft 12 as the center line, so that the second base 7 is in the observing position.

In S62, the second rotation shaft 5 is rotated to drive the second base 7 to rotate, so that the sample to be tested 19 is in the observing position.

In the embodiment, the number of the second base 7 is one or multiple. The number of the limit groove 8 of the second base 7 is one or multiple. When the number of the limit groove 8 of the second base 7 is multiple, the second base 7 can be adjusted to the observing position by rotating the first rotation shaft 12, and the fine adjustment of the sample to be tested 19 can be achieved by rotating the second rotation shaft 5, thereby to achieve detection of multiple samples to be tested 19 and improve detection efficiency.

An explanation will be given of the visual turbidity detection device and the detection method thereof provided in the embodiments of the present disclosure in the following.

Embodiment 1

The visual turbidity detection device includes an observing box, which includes a rear board and a shading board 3. The observing box is provided with a background board 4, which is located in the observing box. The background board 4 is fixed on the small rotation shafts (i.e., the second rotation shafts 5). One end of each small rotation shaft is connected to a small handle (i.e., force application part 6) outside the observing box, and the other end is fixed on the small rotation disc (i.e., second base 7) inside the observing box. A limiting groove (i.e., limit groove 8) is defined on the small rotation disc, and the small rotation disc is fixed on the large rotation disc (i.e., first base 10) through the swivel bearing 9. The large rotation disc is fixed on a shaft body of the central large rotation shaft (i.e., first rotation shaft 12) through an elastic nut 11. One end of the central large rotation shaft is fixed to the base of the observing box through a limit bearing 13 (i.e. the first end of the first rotation shaft 12 is rotatably connected to the bottom wall of the box 1), another end extends to the outside of the observing box, and the another end is connected to the central large handle (i.e., the operating part) outside the observing box. A full spectrum LED spotlight group is installed on the inner side wall of the observing box, and a trapezoidal viewing window (i.e., observing window 16) and a cover locking buckle (i.e. mating part 17) are installed on the observing box. A cover handle is installed on the cover to facilitate the opening and closing of the cover.

In an embodiment, further, the full spectrum LED spotlight group includes multiple full spectrum LED spotlight groups, with multiple full spectrum LED spotlight beams focused on the sample bottle at the test site (i.e. the samples to be tested 19).

In an embodiment, furthermore, a test unit is composed of a small handle, a small rotation shaft, a small rotation disc, background boards 4, a sample bottle and a swivel bearing 9. The test unit has multiple limit grooves 8, all of which are tightly attached to their respective background boards 4. The background boards 4 are white background boards 4 with a black thin stripe in the middle. The background boards 4 are closed loop spliced around the small rotation shaft, and there are several test units on the large rotation disk.

In an embodiment, further, the center of the trapezoidal viewing window, the sample bottle, and the full spectrum LED spotlight group are all at a same horizontal height.

In an embodiment, furthermore, the ways of how the small rotation shaft is fixed on the small rotation disc and how the large rotation disc is fixed on the shaft body of the central large rotation shaft are penetrating through the center of the disc.

In an embodiment, furthermore, the rotation of the small rotation disc and the large rotation disc are driven by the small rotation shaft and the central large rotation shaft, while the rotation of the small rotation shaft and the central large rotation shaft is driven by manually rotating the small handle and the central large handle.

In an embodiment, furthermore, the box 1, small rotation disc, large rotation disc, small rotation shaft, central large rotation shaft, trapezoidal viewing window, cover locking buckle, and the shading board 3 are all made of opaque acrylic panels.

Embodiment 2

The present disclosure also provides a detection method, which is detected by a visual turbidity detection light box in the first embodiment. The specific working principle is as follows.

The back cover of box 1 is opened and the cover handle is used to open the back cover.

The sample bottles are prepared, the sample bottles are placed into the limit grooves 8, which belongs to the same test unit. One sample bottle containing the test sample solution (i.e. samples to be tested 19) and several sample bottles containing the control sample solution (i.e. control sample) in the same test unit are randomly placed. There are no distinguishing marks or hints between these sample bottles, and each sample bottle is distinguished by random numbering.

The back cover is closed after all the samples of multiple sets of test units are placed on the large rotation disk. The cover locking buckle is used to lock the back cover and the shading board 3 is adjusted to prevent light interference from outside the box 1. Whether there are other light sources inside the device that affect sample detection is checked through a trapezoidal viewing window, and then the full spectrum LED spotlight group is turned on.

The large rotation disk is rotated through the central handle to rotate the unit to be tested to position of the trapezoidal viewing window. The small rotation disk is rotated through the small handle of the test unit to rotate the sample bottle to the center of irradiation of the full spectrum LED spotlight group.

The sample bottle and the center of and trapezoidal viewing window are at the same horizontal level as the inspector's line of sight. The inspector assists in observing the turbidity of the sample through the background board 4, and selects a differential sample in each test unit that differs from other sample liquids in turbidity. The number of the differential sample bottle is recorded and the differential phenomenon is described.

Furthermore, this method also includes:

The large rotation disc is driven to rotate by rotating the center handle, the samples to be tested 19 of different test units are rotated to the position of the trapezoidal viewing window, so that multiple sets of samples to be tested 19 can be detected after one sample loading.

After observing the sample, the back cover is open to replace different samples to be tested 19 by the inspector. After completing the observation of the samples to be tested 19, the sample bottle is taken out and the full spectrum LED spotlight group is turned off by the inspector.

Finally, it should be noted that the above embodiments are only used to illustrate the technical solution of the present disclosure, and not to limit it. Although the present disclosure has been described in detail with reference to the aforementioned embodiments, those skilled in the art should understand that they can still modify the technical solutions recorded in the aforementioned embodiments or equivalently replace some of the technical features thereof. And these modifications or replacements do not make the essence of the corresponding technical solutions deviate from the spirit and scope of the technical solutions of the various embodiments of the present disclosure.

What is claimed is:

1. A visual turbidity detection device, comprising:
   an observing box, comprising: a box; wherein the box defines an observing space inside; at least one side of the box defines an observing window, and at least one side of the box is capable of being disassembled from the box to define an opening to take and place a sample to be tested;
   an observing assembly, comprising: a first base and a first rotation shaft; wherein a first end of the first rotation shaft is rotatably connected to a bottom wall of the box, a shaft body of the first rotation shaft is fixedly connected to the first base, and a second end of the first rotation shaft extends out of a top wall of the observing box; the first base is configured to place the sample to be tested; the second end of the first rotation shaft is configured to rotate and drive the first base to rotate under drive of external forces, to make the first base rotate the sample to be tested to an observing position; and the observing window is facing towards the observing position; and
   at least one light assembly, configured to irradiate the sample to be tested in the observing position; wherein the at least one light assembly is disposed on an inner wall of the observing box;
   wherein the observing assembly further comprises: at least one test unit, and each test unit comprises: a second rotation shaft and a second base; in each test unit, the second base is rotatably connected to an upper part of the first base, a third end of the second rotation shaft is fixedly connected to the second base, the second rotation shaft is configured to rotate and drive the second base to rotate relative to the first base under drive of external forces, a fourth end of the second rotation shaft extends out of the observing box, and the second base defines at least one limit groove configured to place the sample to be tested; and wherein the at least one limit groove is a plurality of limit grooves, and the plurality of limit grooves are annularly arranged with the second rotation shaft as a center line; or wherein the at least one test unit is a plurality of test units, and the second rotation shafts of the plurality of test units are annularly arranged with the first rotation shaft as a center line.

2. The visual turbidity detection device as claimed in claim 1, wherein the at least one light assembly is a plurality of light assemblies, and at least one of the plurality of light assemblies is a full spectrum light-emitting diode (LED) spotlight group.

3. The visual turbidity detection device as claimed in claim 2, wherein the plurality of light assemblies are configured to emit light to make light-emitting directions intersect at the observing position; or an axis of the observing window, the plurality of light assemblies and the observing position have a same height.

4. The visual turbidity detection device as claimed in claim 1, wherein each test unit further comprises at least one background board;

wherein in each test unit, the at least one background board is located between the at least one limit groove and the second rotation shaft; and the at least one background board is fixedly connected to the second base; and wherein the at least one background board is a plurality of background boards; and in each test unit, the plurality of background boards are arranged in one-to-one correspondence with the plurality of limit grooves, and the plurality of background boards enclose an installation space of the second rotation shaft.

5. The visual turbidity detection device as claimed in claim 4, wherein each background board is a white background board and each background board provides at least one black stripe.

6. The visual turbidity detection device as claimed in claim 1, wherein the visual turbidity detection device further comprises a shading board, and the first rotation shaft and each second rotation shaft are rotatably connected to the shading board; the second end of the first rotation shaft penetrates through a first connecting hole of the box; the fourth end of each second rotation shaft penetrates through a second connecting hole of the box;

wherein the shading board covers the first connecting hole and each second connecting hole; or the observing box, the shading board and the observing assembly are opaque structures.

7. A detection method applied to the visual turbidity detection device as claimed in claim 1, comprising:

opening the box to define the opening;

placing the sample to be tested on the first base through the opening;

closing the opening;

observing whether an interior of the box is in a dark environment through the observing window;

turning on the at least one light assembly;

rotating the first rotation shaft to drive the first base to rotate to make the sample to be tested to the observing position; and observing the sample to be tested through the observing window, wherein the placing the sample to be tested on the first base through the opening, comprises:

placing the sample to be tested in a limit groove defined on a second base;

wherein the rotating the first rotation shaft to drive the first base to rotate to make the sample to be tested to the observing position comprises:

rotating the first rotation shaft to drive the second base to rotate around the first rotation shaft as the center line through the first base, thereby making the second base be positioned at the observing position; and rotating the second rotation shaft to drive the second base to rotate to make the sample to be tested be positioned at the observing position.

* * * * *